(12) United States Patent
Hayne

(10) Patent No.: US 6,752,101 B2
(45) Date of Patent: Jun. 22, 2004

(54) DEVICE FOR SUPPORTING A MILKING MEMBER

(75) Inventor: John Hayne, Modesto, CA (US)

(73) Assignee: Delaval Holding AB (*) Notice: Subject to any disclaimer, the term of this patent is extended or adjusted under 35 U.S.C. 154(b) by 8 days.

(21) Appl. No.: 10/239,350
(22) PCT Filed: Mar. 21, 2001
(86) PCT No.: PCT/SE01/00602
§ 371 (c)(1),
(2), (4) Date: Dec. 2, 2002
(87) PCT Pub. No.: WO01/70014
PCT Pub. Date: Sep. 27, 2001

(65) Prior Publication Data
US 2004/0040512 A1 Mar. 4, 2004

(30) Foreign Application Priority Data
Mar. 21, 2000 (SE) .................................. 0000965

(51) Int. Cl.⁷ .................................................. A01J 9/08
(52) U.S. Cl. ................................ 119/14.01; 119/14.03; 119/14.51
(58) Field of Search ......................... 119/14.01, 14.03, 119/14.08, 14.47, 14.51, 14.54, 520

(56) References Cited

U.S. PATENT DOCUMENTS

| 3,690,300 | A | * | 9/1972 | Tonelli | 119/14.08 |
|---|---|---|---|---|---|
| 3,789,798 | A | | 2/1974 | Reisgies et al. | |
| 3,938,470 | A | | 2/1976 | Pace | |
| 4,188,910 | A | * | 2/1980 | Hocker | 119/14.08 |
| 4,228,763 | A | * | 10/1980 | Heidecker et al. | 119/14.08 |
| 4,333,421 | A | * | 6/1982 | Schluckbier | 119/14.08 |
| 4,491,085 | A | | 1/1985 | Rubino | |
| 4,838,203 | A | * | 6/1989 | Ellis et al. | 119/14.08 |
| 4,941,433 | A | * | 7/1990 | Hanauer | 119/14.02 |
| 5,809,931 | A | * | 9/1998 | Ellis et al. | 119/14.08 |
| 6,240,878 | B1 | * | 6/2001 | Larson et al. | 119/14.08 |
| 6,289,845 | B1 | * | 9/2001 | Andersson | 119/14.1 |

FOREIGN PATENT DOCUMENTS

| DE | 43 00 884 | 1/1993 |
|---|---|---|
| EP | 0 091 892 | 3/1983 |
| EP | 0 360 354 | 9/1989 |
| GB | 2 226 941 | 7/1990 |
| WO | WO 96/13150 | 5/1996 |

* cited by examiner

Primary Examiner—Yvonne R. Abbott
(74) Attorney, Agent, or Firm—Hovey Williams LLP

(57) ABSTRACT

The invention refers to a device for supporting a milking member in a milking stall (1) and to a milking stall arrangement. The milking member includes a claw (8), a number of teacups (9) connected to the claw, and a long conduit member (11, 12) connecting the claw to a milk-receiving member (7). The stall includes an enclosing structure (2) defining a space (3) for an animal to be milked, and a passage (4) permitting the animal to enter and/or exit the space. The device (15) includes an arm (16), which has a first end portion and a second end portion and is pivotable between an active milking position and a retracted position between milking operations. The arm includes a member (25) for supporting the milking member in the active and inactive positions. A first stop (41, 23) defines the active position of the arm and a second stop (42, 23) defines the inactive position of the arm.

21 Claims, 3 Drawing Sheets

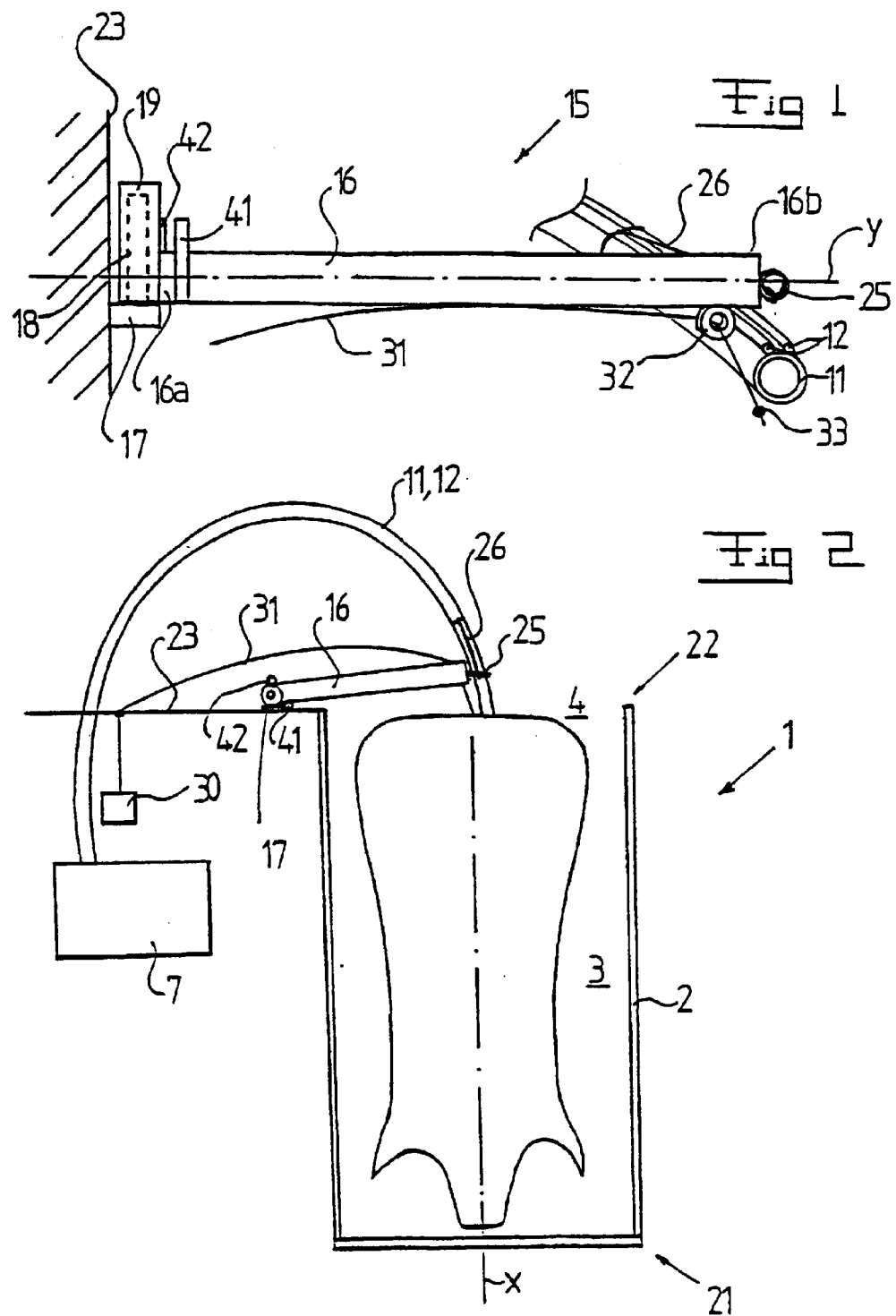

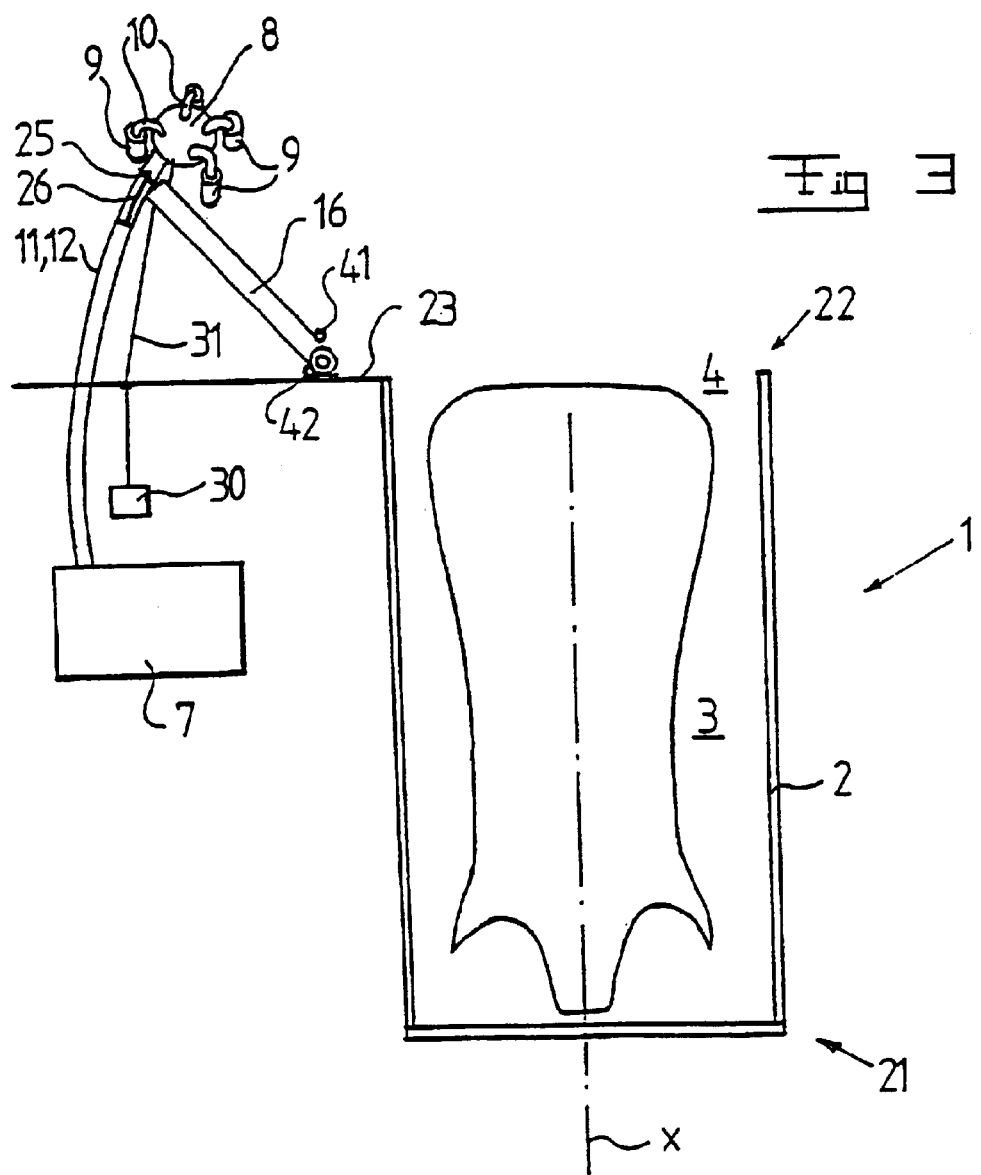

DEVICE FOR SUPPORTING A MILKING MEMBER

THE BACKGROUND OF THE INVENTION AND PRIOR ART

The present invention refers to a device for supporting a milking member in a milking stall according to the preamble portion of claim 1. Furthermore, the present invention refers to a milking stall arrangement according to the preamble portion of claim 20.

It is known to provide such a device for supporting a milking member in different types of milking stall arrangements, such as single milking stalls, tandem milking stalls, rotary milking parlours, etc. Furthermore, such devices including a pivotable arm are known. The arm may be pivotably attached at one end and arranged to carry the milking member at the other end. Usually, such arms are provided in such a way that they are freely pivotable within a certain area. Problems have occurred when such an arm is located in the area of the passage leading to and from the space of the milking stall, since the arm, the milking member and the milk hose is not always properly out of the way for a cow entering and exiting the stall. Thereby, the milking equipment, i.e. the milking member, the milk hose and also the arm can be damaged and, furthermore, the animal can be injured when hitting the milking equipment.

U.S. Pat. No. 3,938,470 discloses a movable arm device for supporting a milking member during the milking operation and in the meantime between the milking operations. The arm device includes several arms being pivotably connected to each other.

U.S. Pat. No. 4,491,085 discloses another movable arm for supporting a milking member by carrying a long milk conduit of the milking member.

EP-A-91 892 discloses a movable arm for supporting the teatcups in connection with automatic attachment of the teatcups to the teats of an animal to be milked.

SUMMARY OF THE INVENTION

The object of the invention is to overcome the problems described above. Consequently, the invention aims at an improved positioning and support device for the milking member and the long milk conduit.

This object is obtained by the device initially defined, which is characterised in that it includes first stop means defining the active position of the arm and second stop means defining the inactive position of the arm.

By such well-defined active positions for the arm it is possible to obtain a proper position and steady support for the milking member during milking of an animal. By such a well-defined retracted, inactive position it is possible to ensure a proper retraction of the arm when an animal is to enter or exit the stall via the passage in such a manner that the arm and the milking member is completely out of the way for the animal.

According to an embodiment of the invention, the first stop means includes a first stop member, provided on one of the arm and the enclosing structure, and a first stop surface, provided on the other of the arm and the enclosing structure, wherein the first stop member is arranged to abut the first stop surface to define the active position. The second stop means may include a second stop member, provided on one of the arm and the enclosing structure, and a second stop surface, provided on the other of the arm and the enclosing structure, wherein the second stop member is arranged to abut the second stop surface to define the inactive position. In such a manner the extreme positions of the arm may be well defined, wherein the arm may be pivoted or rotated between these positions. Advantageously, the first stop member and the second stop member are provided on the arm, wherein the first stop member is provided on one side of the arm and the second stop member is provided the other, opposite side of the arm. Thereby, the position of the stop members in relation to the axial extension of the arm may determine the active position and the inactive position. Moreover, the first stop member may include a first projection extending from said one side of the arm and the second stop member may include a second projection extending from said other side of the arm. Thereby, length of the projections determines the active position and the inactive position.

According to a further embodiment of the invention, the arm in the active position extends to a milking position in the passage, and in the inactive, retracted position is retracted from the passage, thereby permitting the animal to enter and/or exit the space. Advantageously, such a milking position, i.e. the position of the distal end portion of the arm, is substantially immediately behind the animal to be milked, from where the teatcups may be attached to the teats in a convenient manner and where the milking member may be supported in an advantageous manner during the milking operation.

According to a further embodiment of the invention, the device includes a connecting member which is attached to the enclosing structure and to which the first proximal end portion of the arm is pivotably connected. Advantageously, the connecting member may be attached to the enclosing structure in the proximity of the passage, wherein the arm may be pivoted or rotated between the active position in the passage or the inactive position outside the passage. To this end, the connecting member is preferably positioned outside the space. Furthermore, the connecting member may be attached to an outer wall portion of the enclosing structure, wherein the outer wall portion extends in a direction away from the space.

According to a further embodiment of the invention, said first stop surface and said second stop surface are formed by the outer wall portion. In such a manner the positions of the arm may be defined by means of the enclosing structure.

According to a further embodiment of the invention, said supporting means of the arm includes a holding member arranged to hold the long conduit member of the milking member. By supporting the milking member in such a manner, the claw may hang down from the udder to exert a certain pulling force to the teats. Thereby, the milking member may include a lifting cord attached to and extending along the long conduit member, wherein the holding member is arranged to engage the lifting cord. Advantageously, the holding member is provided at the second end portion of the arm.

According to a further embodiment of the invention, a retracting device is provided for retracting the arm from the active position to the inactive position after a milking operation. The retracting device may include an actuator and a pulling cord connected to the actuator and to the milking member, wherein the arm includes a guiding member arranged to guide the pulling cord during the retraction of the arm. In such a manner the arm is retracted to the inactive position at the same time as the milking member is removed from the udder and pulled out of the way for the animal. The guiding member may be provided at the second end portion of the arm. Consequently, the arm guides the milking member during the whole detachment and retraction of the milking member from the udder of the animal.

According to a further embodiment of the invention, the connecting member includes a bearing rod to be attached to the enclosing structure, and a sleeve attached to the first proximal end of the arm and arranged to be rotatably mounted on the bearing rod.

The object is also obtained by the milking stall arrangement initially defined, which is characterised in that the device includes first stop means defining the active position of the arm and second stop means defining the inactive position of the arm. Such a milking stall arrangement may include a plurality of milking stalls arranged in different configurations, and advantageously the arrangement may include a rotary milking parlour on which a plurality of such milking stalls are provided. Thereby, each milking stall extends along a longitudinal axis between a forward end and a rearward end, the passage being located at the rearward end. The milking stalls may be arranged in such a way that the longitudinal axes thereof extend substantially radially with regard to a rotary axis of the parlour, wherein the enclosing structure includes outer wall portions extending between adjacent milking stalls and being associated with a respective one of said devices.

BRIEF DESCRIPTION OF THE DRAWINGS

The present invention is now to be described more closely by the description of different embodiments and with reference to the accompanying drawings, in which FIG. 1 discloses a support device according to the present invention, FIG. 2 discloses a milking stall having a support device in an active position.

FIG. 3 discloses the milking stall of FIG. 1 with the support device in an inactive position.

DETAILED DESCRIPTION OF DIFFERENT EMBODIMENTS OF THE PRESENT INVENTION

Figure 4:
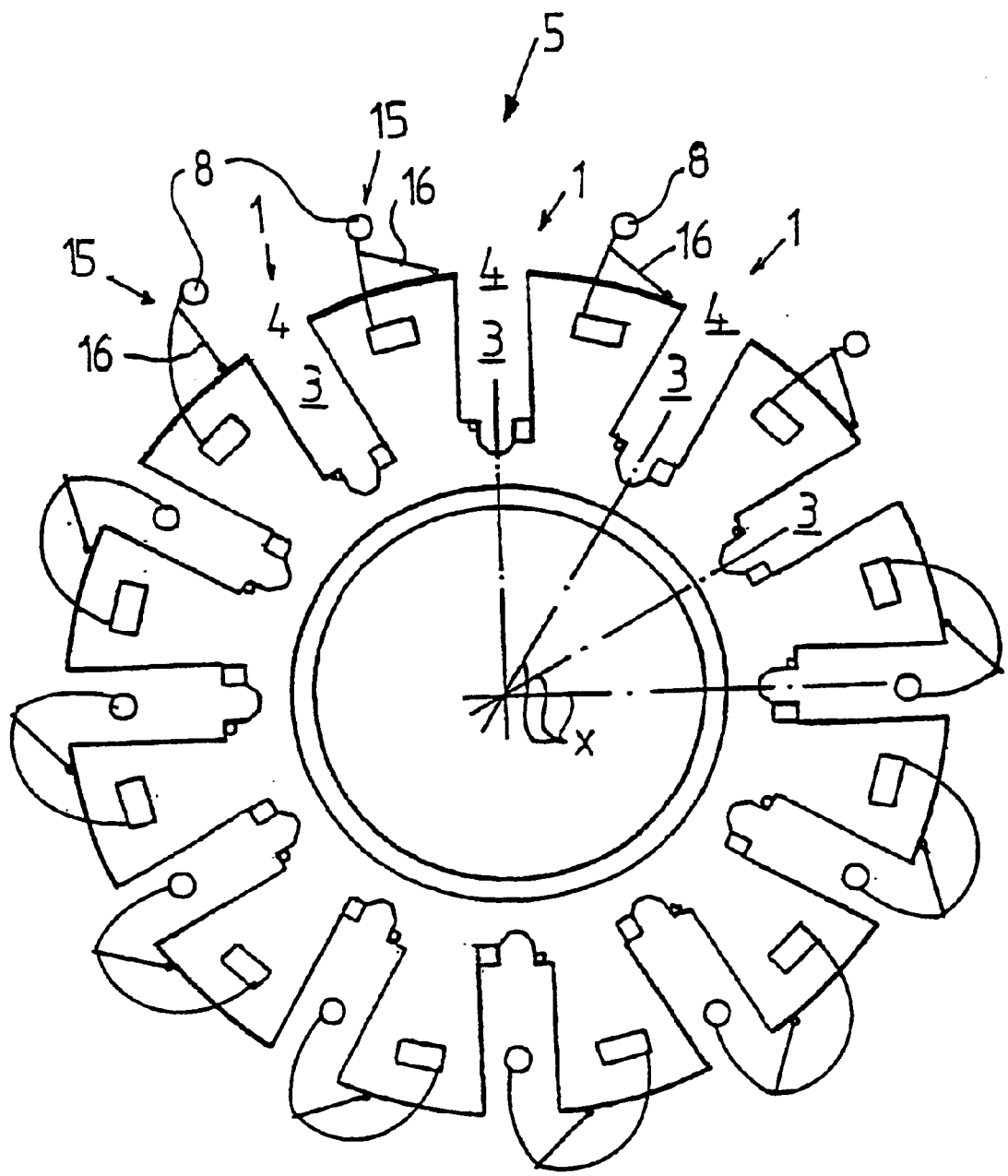
FIG. 4 discloses a milking stall arrangement having a plurality of milking stalls each being associated with a respective support device according to the present invention.

FIGS. 2 and 3 disclose schematically from above a milking stall 1 for milking an animal, in the example disclosed a cow. The milking stall 1 includes an enclosing structure 2 defining a space 3 for the cow to be milked and a passage 4 permitting the cow to enter and exit the space 3. The milking stall 1 disclosed in FIGS. 2 and 3 refers to a single stall for housing one cow. However, according to the invention, a plurality of such milking stalls 1 may be arranged adjacent to each other to form a milking stall arrangement. FIG. 4 discloses an example of such a milking stall arrangement in the form of a so called rotary milking parlour 5 including a plurality of milking stalls 1 arranged adjacent to each other in a circular configuration.

The milking stall 1 is associated with a milking machine 6, which is known per se and may have a conventional design. The milking machine 6 includes a milk-receiving member 7 and a milking member. The milking member includes a claw 8, four teatcups 9 connected to the claw 8 by a respective short milk conduit 10, a long milk conduit 11 and long pulse conduits 12. The long milk conduit 11 and the long pulse conduits 12 form a long conduit member, connecting the claw 8 to the milk-receiving member 7.

A support device 15 is provided for supporting the milking member during milking of the cow and in the meantime between milking operations. The support device 15 is disclosed more closely in FIG. 1. The support device 15 includes an arm 16 which has a first proximal end portion 16a and a second distal end portion 16b. The arm 16 is pivotable or rotatable between an active position during a milking operation, disclosed in FIG. 2, and an inactive, retracted position between milking operations, disclosed in FIG. 3. The arm 16 may be formed by an elongated member, for instance, a pipe having a longitudinal centre axis y.

The support device 15 includes a connecting member 17, which is attached to the enclosing structure 2. The first proximal end portion 16a of the arm 16 is pivotably or rotatably connected to the connecting member 17. The connecting member 17 includes a bearing rod 18 to be attached to the enclosing structure 2. The bearing rod 18 is substantially circular cylindrical in a cross-section and extends substantially vertically. The arm 16 includes a sleeve 19 attached to the first proximal end portion 16a of the arm 16 and intended to receive the bearing rod 18 in such a manner that the arm 16 is rotatably mounted on the bearing rod 18.

The space 3 of the milking stall 1 has a forward end 21 and a rearward end 22. The space 3 extends along a longitudinal axis x between said forward end 21 and said rearward end 22. The passage 24 is provided at the rearward end 22. The enclosure structure 2 includes wall portions defining said space 3 and an outer wall portion 23 extending in a direction away from the space 3. In the embodiment disclosed in FIGS. 2 and 3, the outer wall portion 23 extends substantially vertically and in a direction substantially perpendicular to the longitudinal axis x. The connecting member 18 is positioned outside the space 3 in the proximity of the passage 4 by being attached to the outer wall portion 23 of the enclosing structure 2.

The support arm 16 includes a holding member 25 arranged to support the long milk conduit 11 and the long pulse conduits 12. Thereby, the holding member 25 includes a hook-like member forming an open loop arranged to receive a lifting cord 26 of the conduits 11, 12. The lifting cord may be realised by a cord, a chain, a wire or any similar elongated element. The lifting cord 26 is attached to and extends along the conduits 11 and 12. The lifting cord 26 is attached to the conduits 11, 12 at several positions. By this arrangement, the claw 8 is carried to a certain extent by means of the arm 16 although the claw is not rigidly connected to the arm 16. Consequently, the claw 8 and the teatcups 9 may hang substantially vertically downwardly from the teats of the cow when the milking member is attached to the animal.

Furthermore, a retracting device is provided for retracting the arm from the active position disclosed in FIG. 2 to the inactive position disclosed in FIG. 3. The retracting device includes an actuator 30 and a pulling cord 31, which is connected to the actuator 30 and to the claw 8 of the milking member, and which may be realised by a cord, a chain, a wire or the like. Consequently, the retracting device 30, 31 also will function as a remover for removing the milking member from the teats when the milking operation is finished. To enable a proper functioning of the retracting and removing device 30, 31, the pulling cord 31 is guided through a guiding member 32 attached to the second, distal end 16b of the support arm 16. A guiding member 32 includes an eyelet or a ring, through which the pulling cord 31 runs. The pulling cord 31 includes a stopper 33 which has a dimension exceeding the diameter of the ring of the guiding member 32. The stopper 33 is provided between the guiding member 32 and the claw 8. When the pulling cord 31 is retracted by the actuator 30 and the stopper 33 has reached the guiding member 32, a continuing retraction of the actuator 30 will force the arm 16 from the active position to the inactive position.

The support device 15 includes first stop means defining the active position of the arm 16 and second stop means defining the inactive position of the arm 16. The first stop means includes a first stop member 41, which is provided on the arm 16 and which is arranged to abut a first stop surface defined by the outer wall portion 23 in order to define the active position. Moreover, the second stop means includes a second stop member 42 provided on the arm 16 and arranged to abut a second stop surface defined by the outer wall portion 23 in order to define the inactive position of the arm 16. The first stop member 41 and the second stop member 42 are provided at the first, proximal end portion 16a of the arm 16. The first stop member 41 is provided on one side of the arm 16 and the second stop member 42 is provided on the other opposite side of the arm 16. The first stop member 41 includes a first projection extending from said one side of the arm 16 and the second stop member 42 includes a second projection extending from said other side of the arm 16. In the embodiment disclosed, the stop members 41, 42 are realised by substantially circular cylindrical rods extending vertically and being welded to the arm 16. As appears from the figures, the first stop member 41 is provided at a greater distance along the longitudinal axis y of the arm 16 from the first end of the arm 16 than the second stop member 42. In such a way, the angle of inclination between the longitudinal axis y of the arm 16 and the substantially planar outer wall portion 23 is significantly smaller in the active position than in the inactive position. Consequently, as appears from FIGS. 2 and 3, the arm 16 in the active position extends to a milking position in the passage 4 and substantially immediately behind the cow to be milked. In the inactive position, the arm 16 is clearly retracted from the passage 4, thereby permitting the animal to enter and exit the space 3.

As mentioned above, FIG. 4 discloses another embodiment of the invention including a rotary milking parlour 5 having a plurality of milking stalls 1 each being provided with a support device as described in connection with FIGS. 1–3. The support devices 15 are attached to outer wall portions 23 of the rotary milking parlour 5, which wall portions 23 extend between adjacent milking stalls 1.

The present invention is not limited to the embodiment disclosed but may be varied and modified within the scope of the following claims. For instance, the arm 16 does not need to have the straight extension as disclosed in the figures but may be at least slightly curved. Moreover, the arm 16 may have another than a circular cross-section, for instance a square cross-section. The support device 15 disclosed may be used in connection with milking stalls of a plurality of different configurations and not only the milking stall configuration disclosed in this application. The support device does not have to be attached to a wall portion of an enclosing structure but may for instance be attached to a substantially planar plate attached to any rigid element in the proximity of a milking stall.

Although the stop members 41 and 42 are provided on the arm 16, it is to be noted that they may be provided on the wall portion 23 as well. It is also possible within the scope of the claims to provide one of the stop members 41, 42 on the arm 16 and the other on the wall portion 23.

What is claimed is:

1. A device for supporting a milking member in a milking stall, the milking member including a claw, a number of teacups connected to the claw by a respective short milk conduit, and a lung conduit member connecting the claw to a milk receiving member of a milking machine,
   the milking stall including an enclosing structure defining a space for an animal to be milked, and a passage permitting the animal to enter and/or exit the space,
   the device including an arm, which has a first proximal end portion and a second distal end portion and which is pivotable between an active position during a milking operation and an inactive, retracted position between milking operations,
   the arm including means for supporting the milking member in the active position and the inactive position,
   the device comprising first stop means defining the active position of the arm, and second stop means defining the inactive position of the arm, wherein said supporting means of the arm includes a holding member, which is arranged to hold the long conduit member of the milking member and is provided at the second end portion of the arm.

2. A device according to claim 1, wherein the first stop means includes a first stop member, provided on one of the arms and the enclosing structure, and a first stop surface provided on the other of the arm and the enclosing structure, wherein the first stop member is arranged to abut the first stop surface to define the active position.

3. A device according to claim 2, wherein the second stop means includes a second stop member provided on one of the arms and the enclosing structure, and a second stop surface, provided on the other of the arm and the enclosing structure, wherein the second stop member is arranged to abut the second stop surface to define the inactive position.

4. A device according to claim 3, wherein the first stop member and the second stop member are provided on the arm, wherein the first stop member is provided on one side of the arm and the second stop member is provided on the other opposite side of the arm.

5. A device according to claim 4, wherein the first stop member includes a first projection extending from said one side of the arm and the second stop member includes a second projection extending from said other side of the arm.

6. A device according to claim 1, wherein the arm in the active position extends to a milking position in the passage, and in the inactive, retracted position is retracted from the passage thereby permitting the animal to enter and/or exit the space.

7. A device according to claim 6, wherein the milking position is substantially immediately behind the animal to be milked.

8. A device according to claim 1, wherein the device includes a connecting member which is attached to the enclosing structure and to which the first proximal end portion of the arm is pivotably connected.

9. A device according to claim 8, wherein the connecting member is attached to the enclosing structure in the proximity of the passage.

10. A device according to claim 9, wherein the connecting member is positioned outside the space.

11. A device according to claim 10, wherein the connecting member is attached to an outer wall portion of the enclosing structure, wherein the outer wall portion extends in a direction away form the space.

12. A device according to claim 11, wherein the first stop means includes a first stop member provided on one of the arm and the enclosing structure, and a first stop surface provided on the other of the arm and the enclosing structure, wherein the first stop member is arranged to abut the first stop surface to define the active position, and wherein the second stop means includes a second stop member provided on one of the arms and the enclosing structure, and a second stop surface provided on the other of the arm and the enclosing structure, wherein the second stop member is arranged to abut the second stop surface to define an inactive position, and wherein said first stop surface and said second stop surface are formed by the outer wall portion.

13. A device according to claim 1, wherein the milking member includes a lifting cord attached to and extending along the long conduit member, wherein the holding member is arranged to engage the lifting cord.

14. A device according to claim 1, wherein retracting device is provided for retracting the arm from the active position to the inactive position after a milking operation.

15. A device according to claim 14, wherein the retracting device includes an actuator and a pulling cord connected to the actuator and to the milking member, wherein the arm includes a guiding member arranged to guide the pulling cord during the retraction of the arm.

16. A device according to claim 15, wherein the guiding member is provided at the second end portion of the arm.

17. A device according to claim 1, wherein the connecting member includes a bearing rod to be attached to the enclosing structure, and a sleeve attached to the first proximal end of the arm and arranged to be rotatably mounted on the bearing rod.

18. A milking stall a arrangement comprising:
- at least one milking member including a claw, a number of teacups connected to the claw by a respective short conduit member, and a long conduit member connecting the claw to a milk-receiving member of a milking machine,
- at least one milking stall including an enclosing structure defining a space for an animal to be milked, and a passage permitting the animal to enter and/or exit the space,
- at least one support device including an arm, which has a first proximal end portion and a second distal end portion and which is pivotable between an active position during a milking operation and an inactive, retracted position between milking operations,
- the arm including means for supporting the milking member in the active position and the inactive position,
- the device including first stop means defining the active position of the arm and second stop means defining the inactive position or the arm, wherein said supporting means of the arm includes a holding member, which is arranged to hold the long conduit member of the milking member and is provided at the second end portion of the arm.

19. A milking stall arrangement according to claim 18, wherein the arrangement includes a rotary parlour on which a plurality of such milking stalls are provided.

20. A milking stall arrangement according to claim 18, wherein each milking stall extends along a longitudinal axis between a forward end and a rearward end, the passage being located at the rearward end.

21. A milking stall arrangement according to claim 20, wherein the milking stalls are arranged in such a way that the longitudinal axis thereof extend substantially radially with regard to a rotary axis of the parlour, wherein the enclosing structure includes outer wall portions extending between adjacent milking stalls and being associated with a respective one of said devices.

* * * * *